US008763115B2

(12) United States Patent
Budko et al.

(10) Patent No.: US 8,763,115 B2
(45) Date of Patent: Jun. 24, 2014

(54) IMPEDING PROGRESS OF MALICIOUS GUEST SOFTWARE

(75) Inventors: Dmitriy Budko, Sunnyvale, CA (US);
Xiaoxin Chen, Cupertino, CA (US);
Oded Horovitz, Palo Alto, CA (US);
Carl A. Waldspurger, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 1324 days.

(21) Appl. No.: 12/051,516

(22) Filed: Mar. 19, 2008

(65) Prior Publication Data

US 2009/0044274 A1    Feb. 12, 2009

Related U.S. Application Data

(60) Provisional application No. 60/954,733, filed on Aug. 8, 2007.

(51) Int. Cl.
*G06F 21/00* (2013.01)

(52) U.S. Cl.
USPC .............................................. 726/22; 726/24

(58) Field of Classification Search
USPC ................................ 726/22, 24, 23; 713/164
See application file for complete search history.

(56) References Cited

U.S. PATENT DOCUMENTS

| | | | |
|---|---|---|---|
| 5,761,511 A | 6/1998 | Gibbons et al. | |
| 6,101,524 A | 8/2000 | Choi et al. | |
| 6,298,476 B1 | 10/2001 | Misheski et al. | |
| 6,397,242 B1 | 5/2002 | Devine et al. | |
| 6,484,309 B2 | 11/2002 | Nowlin, Jr. et al. | |
| 6,550,052 B1 | 4/2003 | Joyce et al. | |
| 6,601,233 B1 | 7/2003 | Underwood | |
| 6,704,925 B1 | 3/2004 | Bugnion | |
| 6,785,886 B1 | 8/2004 | Lim et al. | |
| 6,941,545 B1 | 9/2005 | Reese et al. | |
| 6,954,923 B1 | 10/2005 | Yates, Jr. et al. | |
| 7,035,963 B2 | 4/2006 | Neiger et al. | |
| 7,043,716 B2 | 5/2006 | Zimmer et al. | |
| 7,117,481 B1 | 10/2006 | Agesen et al. | |
| 7,155,704 B2 | 12/2006 | Williams | |
| 7,222,221 B1 | 5/2007 | Agesen et al. | |
| 7,260,815 B1 | 8/2007 | Chen et al. | |
| 7,272,815 B1 | 9/2007 | Eldridge et al. | |
| 7,421,681 B2 | 9/2008 | DeWitt, Jr. et al. | |
| 7,676,294 B2 | 3/2010 | Baier et al. | |
| 7,685,638 B1 * | 3/2010 | Buches ........................... | 726/22 |
| 7,716,638 B2 | 5/2010 | Thornton | |
| 7,748,037 B2 | 6/2010 | Rajagopal et al. | |
| 7,810,083 B2 | 10/2010 | Chinya et al. | |
| 7,818,808 B1 | 10/2010 | Neiger et al. | |

(Continued)

OTHER PUBLICATIONS

U.S. Appl. No. 11/584,178, filed Oct. 20, 2006, entitled "Isolating Data Within a Computer System Using Private Shadow Mappings", by Chen et al.

(Continued)

*Primary Examiner* — Edward Zee

(57) ABSTRACT

One embodiment of the present invention is a method of operating a virtualization system, the method including: (a) instantiating a virtualization system on an underlying hardware machine, the virtualization system exposing a virtual machine in which multiple execution contexts of a guest execute; (b) monitoring the execution contexts from the virtualization system; and (c) selectively impeding computational progress of a particular one of the execution contexts.

42 Claims, 6 Drawing Sheets

(56) References Cited

U.S. PATENT DOCUMENTS

| | | |
|---|---|---|
| 7,823,135 B2 | 10/2010 | Horning et al. |
| 7,865,876 B2 | 1/2011 | Griffin et al. |
| 7,904,909 B1 | 3/2011 | Reiner et al. |
| 7,908,653 B2 | 3/2011 | Brickell et al. |
| 7,953,980 B2 | 5/2011 | Schluessler et al. |
| 7,984,304 B1 | 7/2011 | Waldspurger et al. |
| 7,984,420 B2 | 7/2011 | Eldridge et al. |
| 8,024,798 B2 | 9/2011 | Moritzen |
| 8,086,822 B2 | 12/2011 | Devine et al. |
| 8,095,911 B2 | 1/2012 | Ronen et al. |
| 2005/0216795 A1* | 9/2005 | Dawkins et al. ............... 714/100 |
| 2006/0021029 A1* | 1/2006 | Brickell et al. ................. 726/22 |
| 2007/0079090 A1* | 4/2007 | Rajagopal et al. ............ 711/163 |
| 2007/0271610 A1* | 11/2007 | Grobman ........................ 726/22 |
| 2009/0055571 A1 | 2/2009 | Budko et al. |
| 2009/0055693 A1 | 2/2009 | Budko et al. |

OTHER PUBLICATIONS

Notice of Allowance for U.S. Appl. No. 12/188,973, mailed Jun. 27, 2012.

Non-Final Rejection for U.S. Appl. No. 12/188,973, mailed Jan. 13, 2012.

* cited by examiner

IMPEDING PROGRESS OF MALICIOUS GUEST SOFTWARE

CROSS-REFERENCE TO RELATED APPLICATION(S)

This application claims benefit under 35 U.S.C. §119(e) of U.S. Provisional Application No. 60/954,733, filed Aug. 8, 2007.

BACKGROUND

The vulnerability of computer systems, configurations, software, information codings and protocols to unauthorized access or use is problematic. In general, these vulnerabilities can range from minor annoyances to national security risks. Automated tools facilitate probing of systems and discovering vulnerable systems and configurations. Once vulnerabilities are identified, exploits (often embodied as computer viruses, worms, trojans, spyware, rootkits and/or other malicious forms of code) can be globally disseminated and rapidly employed.

In recognition of threats posed by such vulnerabilities, methods have been developed to identify malicious software in use, in media or in transit. Indeed, persons of skill in the art will appreciate a broad range of existing methods including signature- and/or behavior-based detection methods employed in commercially-available anti-virus and/or intrusion detection/prevention systems.

For at least some systems, it can useful to terminate, isolate or otherwise mitigate operation of malicious code, however identified. However, many of the tools and facilities that might provide a method for terminating, isolating or mitigating malicious code are themselves subject to compromise. For example, if an operating system (or an antivirus/intrusion detection facility) is itself compromised, it may be unrealistic to expect the compromised system/facility to reliably interdict malicious code even if an exploit is successfully identified. Indeed, a common strategy of many exploits (after gaining privileged access) is to disable or otherwise subvert the very systems that are designed to protect against them.

SUMMARY

Embodiments of the present invention include methods, systems, apparati, computer program products and other tangible realizations of techniques for selectively impeding progress of malicious software using facilities of a virtualization system. In particular, one embodiment of the present invention is a method of operating a virtualization system, the method comprising: (a) instantiating a virtualization system on an underlying hardware machine, the virtualization system exposing a virtual machine in which multiple execution contexts of a guest execute; (b) monitoring the execution contexts from the virtualization system; and (c) selectively impeding computational progress of a particular one of the execution contexts.

BRIEF DESCRIPTION OF THE DRAWINGS

The use of the same reference symbols in different drawings indicates similar or identical items.

DESCRIPTION

Figure 1:
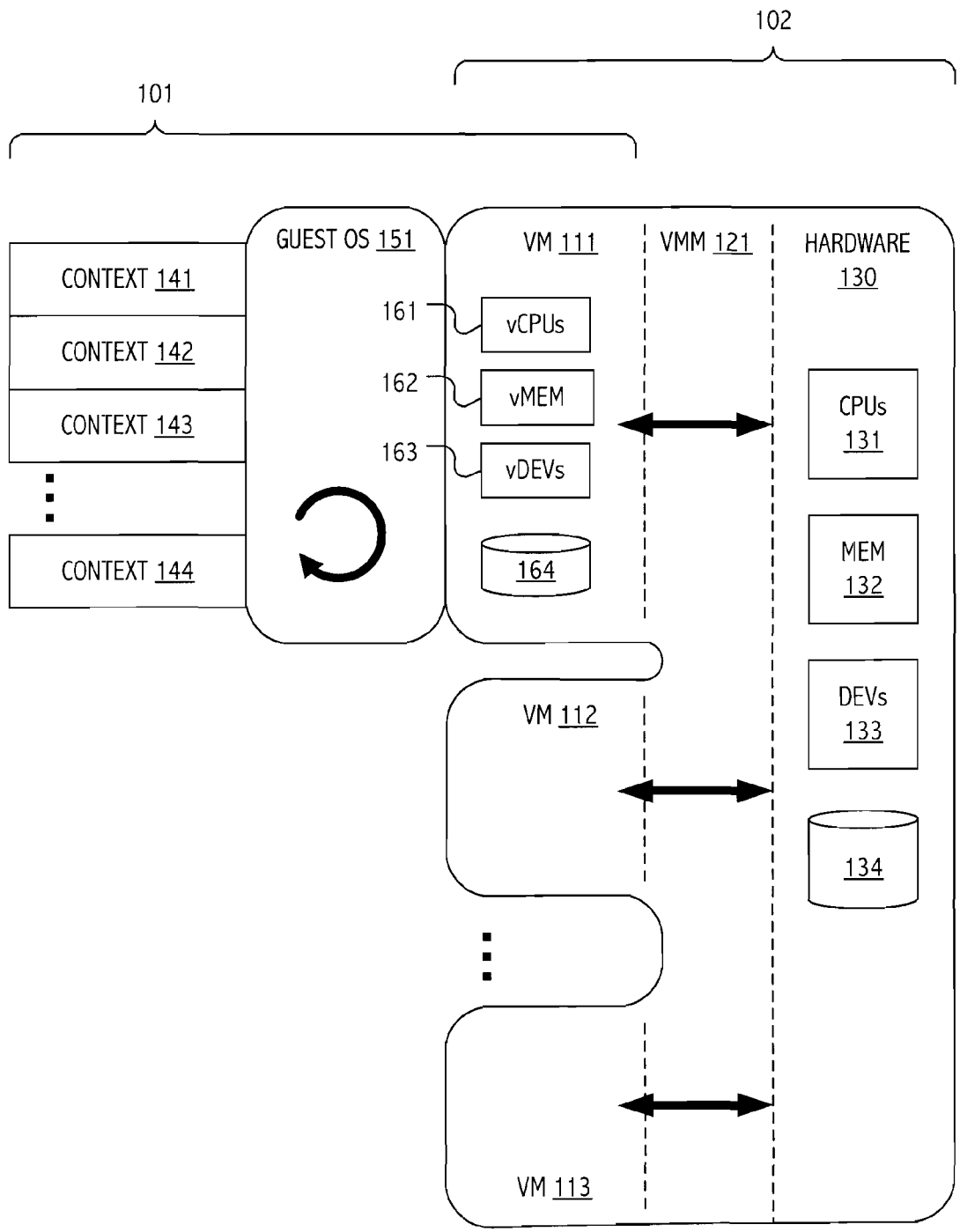
FIG. 1 depicts a virtualization system in which one or more embodiments of the present invention may be employed.

One or more embodiments of the present invention include methods for selectively impeding progress of malicious software. In some embodiments, methods are employed to interdict malicious software that is identified (whether detected or merely suspected) using anti-malware techniques. In particular, in accordance with one or more embodiments of the present invention, it is possible to selectively impede, from behind a virtualization barrier, progress of certain execution contexts that would otherwise execute within a virtual machine. Typically, such execution contexts (often referenced in the art as "processes," "threads" or "tasks") correspond to an application or service that can be monitored for indicia of maliciousness or which can be presumed malicious until otherwise qualified. Accordingly, some embodiments of the present invention can, in general, be employed to impede progress of malicious software without regard to how such malicious software is identified.

For the most part, one or more embodiments of the present invention for impeding progress operate at (or from) a virtualization layer (e.g., within a virtual machine monitor or hypervisor) and, in many embodiments, do not require cooperation or support from a guest operating system running within a virtual machine. This independence can be useful when, as is often the case, an operating system is (or may be) compromised by the malicious software itself or via a complementary attack vector.

Although one or more embodiments of the present invention are described in an overall context that can often include anti-virus, anti-spyware, intrusion detection/protection or other anti-malware systems or techniques, it is important recognize that one or more embodiments of the present invention do not presuppose any particular anti-malware system or technique. Indeed, one or more embodiments of the present invention may be implemented in software systems or computer program products that do not themselves provide malware detection. In such embodiments, an interdiction mechanism or facility for a separate anti-malware system, e.g. via an application programming interface (API) can be provided. Alternatively, embodiments of the present invention may be integrated or cooperative with malware detection that operates behind a virtualization barrier. Thus, some embodiments are implemented in software that implements the virtualization system itself, or in software that implements an operating system that exposes and isolates individual virtual machines. In general, one or more embodiments of the present invention may be used in conjunction with conventional (or hereafter developed) anti-malware systems.

Several illustrative embodiments of the present invention are described herein. In general, the described embodiments may be employed individually or in combination in a given implementation. The embodiments will be understood both in terms of general strategies (such as selective alteration of virtual machine operation, modifications to code and/or control flows or resource restrictions that target a particular execution context) and based on specific implementations.

For example, in some embodiments, virtual machine operations may be selectively altered to supply a fault, trap or interrupt under circumstances in which faithful emulation of a particular physical machine would not otherwise dictate. Note that the configuration of any particular physical machine virtualized may, but need not, precisely correspond to an underlying physical hardware configuration on which the virtualization system executes. Selective alterations may interdict transitions (e.g., based on an otherwise valid system call) between user and kernel modes of virtual machine emulation. In some embodiments, behavior of a virtual machine may be selectively altered to supply a guest computation with a succession of events (e.g., timer interrupts) not dictated by faithful emulation of the machine virtualized, but rather, selected to cause the guest to deschedule or deprioritize computations of a particular execution context. In some embodiments, page table entries are selectively modified to preclude or impede a particular execution context from reading, writing or executing from an otherwise mapped memory page. In some embodiments, the instruction sequences actually executed for a particular execution context are altered. Typically, such alternations can be made in the virtualization system (e.g., using a binary translation facility) to effect the desired changes to code semantics or control flows.

For concreteness, embodiments based on facilities, terminology and exploits typical of certain processor architectures, operating systems, virtualization systems and network protocols and/or services are described. For example, conventional processor and operating system features, mechanisms and constructs typical of microprocessors and software available from Intel Corporation and Microsoft Corporation provide a useful descriptive context for our techniques. That said, embodiments of the present invention are general to a wide variety of processor and system architectures (including both single- and multi-processor architectures based on any of a variety of instruction set architectures), to numerous operating system implementations as well as to computations that need not include, or be coordinated by, a conventional operating system.

Similarly, although embodiments of the present invention are illustrated largely in the context of virtualization systems that support execution of one or more operating system instances, persons of ordinary skill in the art will recognize that the boundaries between an operating system and a virtualization system may (in some cases) be blurred. More specifically, based on the description herein, persons of ordinary skill in the art will appreciate embodiments in which an operating system includes virtualization features or in which a virtualization system provides some (or all) of the facilities usually associated with an operating system.

Accordingly, in view of the foregoing and without limitation on the range of underlying processor, hardware or system architectures; operating systems; or virtualization techniques that may be employed in embodiments of the present invention, based on these embodiments, and on the claims that follow, persons of ordinary skill in the art will appreciate a broad range of suitable implementations and embodiments.

Virtualization Systems, Generally

FIG. 1 depicts a virtualization system in which techniques in accordance with one or more embodiments of the present invention may be employed. In particular, FIG. 1 is meant to illustrate a class of virtualization system embodiments in which underlying hardware resources 130 are exposed to guest computations as one or more isolated, and apparently independent, virtual machines (e.g., VM 111, VM 112 ... VM 113). In the illustrated system, guest system 151 (e.g., an instance of a conventional Microsoft® Windows or Linux-type operating system) executes in coordination with VM 111, providing application software and operating system services with virtual computer 101 on (or in) which to execute. As is typical of modern operating system design, applications (and some services) usually run in their own memory address spaces and can include one or more execution contexts (e.g., contexts 141, 142, 143 ... 144) each having an associated instruction pointer and other state. Typically, an execution context, which may be referred to as a "process," "thread" or "task" depending on conventions of the particular operating system or execution environment, includes at least state of processor registers (and perhaps uncommitted memory state) together with a virtual address space (consistent with page table mappings).

As on a conventional hardware computer platform, guest operating system 151 coordinates execution sequences of instructions on one or more processors (or CPUs), helps to maintain memory management and/or mapping information (e.g., virtual-to-physical page mappings) and manages devices of an underlying computational machine. Together, the operating system and underlying computational machine (e.g., guest operating system 151 and VM 111 of virtual computer 101 in the illustrated configuration) manage context switches amongst various execution contexts based on priority, data or instruction memory access stalls, input/output events, explicit code directives, etc. Numerous techniques and designs (both hardware and software) for scheduling and performing context switches in multitasking/multithreaded systems are known and will be understood by persons of ordinary skill in the art. However, in each case, the identity of at least a current execution context is part of the observable state of the computational machine (or in the illustration of FIG. 1, of VM 111).

From the perspective of operating system 151 and the individual execution contexts thereof, exposed VM 111 appears to be and, indeed, behaves like a conventional hardware computer platform, executing instruction sequences and presenting an apparent processor and memory state. Indeed, in some embodiments of virtualization system 102, the interface presented by VM 111 may be nearly indistinguishable from a conventional hardware computer platform. However, unlike a conventional hardware computer platform, virtualization system 102 itself manages underlying hardware resources (e.g., without limitation, CPUs 131, memory 132, devices 133 and storage 134) and exposes virtual resources (e.g., virtual processor(s) 161, vMEM 162, virtual devices 163 and virtual storage 164) rather than the underlying resources themselves to guest computations such as guest operating system 151 and any applications/services executing therewith. In general, the characteristics and configurations of an exposed virtual machine need not match those of underlying hardware resources, although in many implementations, a correspondence between instruction set architectures of exposed virtual processors and underlying hardware CPUs may be desirable.

Although particular virtualization strategies/designs are described herein, virtualization system 102 is representative of a wide variety of designs and implementations in which underlying hardware resources are presented to software (typically to operating system software and/or applications)

as virtualized instances of computational systems that may or may not precisely correspond to the underlying physical hardware.

Virtualization systems are well known in the art and include commercial implementations, such as VMware® ESX Server™, VMware® Server and VMware® Workstation, available from VMware, Inc., Palo Alto, Calif.; operating systems with virtualization support, such as Microsoft® Virtual Server 2005; and open-source implementations such as those available from XenSource, Inc. Accordingly, persons of ordinary skill in the art will appreciate the described embodiments for selectively impeding progress of a targeted computation in the context of a substantial existing body of virtual machine technology.

Typically, virtual resources of an exposed virtual machine are presented to a guest computation using mapping and/or emulation techniques. In general, some interface is provided between the guest software and the various hardware components and devices in the underlying hardware platform. This interface may include one or more software components and/or layers, possibly including one or more software components known in the field of virtual machine technology as "virtual machine monitors" (VMMs), "hypervisors," or virtualization "kernels." For purposes of illustration only, and without limitation, VMM layer 121 is illustrated in which the operative mappings and/or emulations will typically be performed. In the description that follows, certain enhancements or alterations are described that may be made to VMM and/or VM operation to selectively impede computational progress of a targeted execution context.

These and other embodiments will be understood with reference to the description that follows. The following describes embodiments of the present invention for selectively impeding computational progress of a targeted context executing in connection with a virtual machine.

Virtualization System Support for Selectively Impeding Progress

Figure 2:
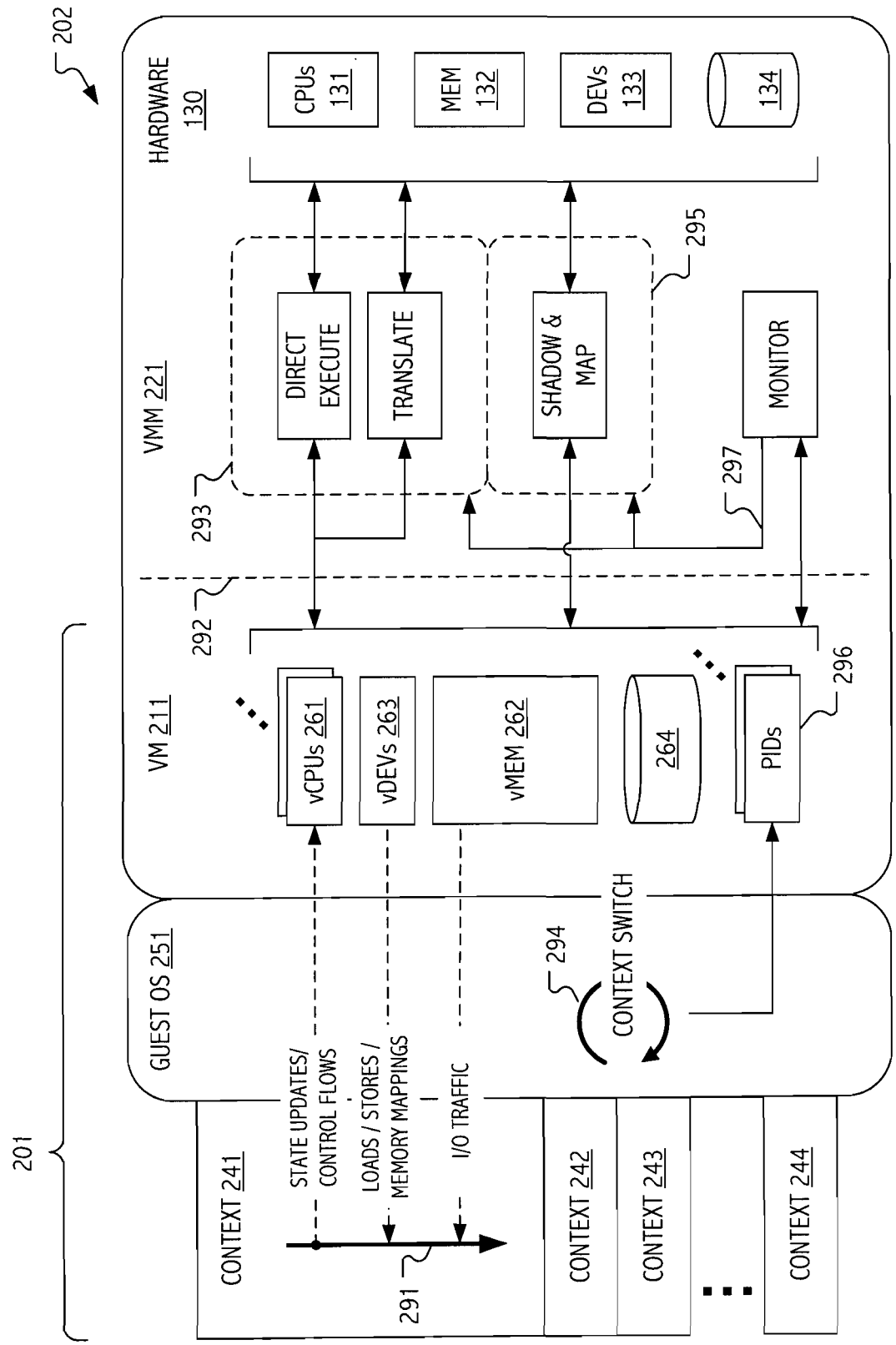
FIG. 2 is a functional block diagram illustrating hardware and software components of a virtualization system that supports operation of a guest operating system (and execution contexts thereof) and in which one or more embodiments of the present invention for selectively impeding progress of certain execution contexts are implemented.

FIG. 2 is a functional block diagram illustrating hardware and software components of a virtualization system that supports operation of a guest operating system (and execution contexts thereof) and in which one or more embodiments of the present invention for selectively impeding progress of certain execution contexts are implemented. As previously explained with reference to FIG. 1, an operating system instance, e.g., guest operating system 251, coordinates execution of various execution contexts (corresponding generally to processes, threads and/or tasks) on an exposed virtual machine, e.g., VM 211. Thus, virtual computer 201 operates (at least from the perspective of operating system 251 and execution contexts 241, 241, 243 . . . 244) in a manner largely analogous to a conventional hardware computer.

Each virtual CPU (vCPU) typically has its own "active" context and, at any given time, an execution context (e.g., current context 241) will be current and state of at least one vCPU 261 corresponds thereto. In particular, register states, instruction pointer state, memory address translation data structures etc. presented by VM 211 are those appropriate to the current state of current context 241. Therefore, instruction sequences (including sequences of user code and system calls appropriate to current context 241) are executed on VM 211 and ordinarily result in progress of a computation associated with current context 241. In particular, individual instructions of instruction sequence 291 are ordinarily executed and result in updates to register state of exposed vCPU 261. Control flow instructions affect call/return stacks and load & store instructions affect buffer and vMEM 262 states, as well as memory address translation data structures (including page table states, translation lookaside buffer (TLB) states, etc) that reside in memory exposed as vMEM 262. Input/output operations affect the state of exposed vDEVs 264 and typically transfer data through buffers in memory exposed as vMEM 262.

As is typical in the art, switches between execution contexts are managed or initiated by operating system 251 based on desired multitasking and scheduling behavior and based on events such execution and/or memory access stalls and interrupts or faults supplied by VM 211. Context switch handling is well understood in the art, but typically includes writing back some state corresponding to a "switched out" context (e.g., register state of a processor, current instruction pointer, stack pointer, etc.) to a backing store and loading from such a backing store (e.g., memory) at least some corresponding to a "switched in" context. Of course, in some processor implementations, architectural techniques (including e.g., large onboard register sets with context-selectable subsets and simultaneous multithreading techniques) may facilitate lightweight context switches in which overheads associated with transfers to and from a backing store can be minimized. Depending on the implementation, VM 211 (particularly exposed vCPU 261) may leverage similar facilities including those supported by underlying hardware.

In any case, a switch 294 between execution contexts typically results in some observable change in architectural state of the processor (whether implemented as a hardware processor or, as in FIG. 2, as vCPU 261). For example, in a processor conforming to the Intel® IA-32 microprocessor architecture, states of certain registers, e.g., Control Register 3 (CR3, also known as the Page Table Base Register, PTBR) and the Local Descriptor Table Register (LDTR) which contains the address in memory of the Local Descriptor Table Register (LDT), can be expected to change in correspondence with a context switch. As a result, contents of the CR3 register are often used in IA-32 architectures as a process id tracking mechanism. Of course, other instruction set architectures and implementations may provide other facilities suitable facilities for tracking context switches, and based on the description herein, persons of ordinary skill in the art will appreciate suitable adaptations. For example, some architectures expose an explicit address space identifier (sometimes called an ASID) which may be employed in a manner similar to that described above with respect to the CR3 register of IA-32 architectures. Similarly, a guest operating system may use its own identifier for a context, e.g., a process identifier (PID). Accordingly, in some embodiments in accordance with the present invention, a virtualization system may read such an identifier directly from guest kernel memory.

Recognizing the variety of alternative mechanisms by which a processor and/or operating system may maintain context identifiers, embodiments of the present invention are described with generality. Accordingly, in the illustration of FIG. 2, VM 211 exposes register(s) 296 in, or via, which a context or process ID (PID) is encoded or may be referenced (e.g., using CR3, PTBR, LDTR, ASID or PID states, etc.) for corresponding vCPUs. Note that, despite the use (here and elsewhere) of the shorthand "PID," nothing herein shall be construed as limiting embodiments to mechanisms for context identification that rely on a guest operating system support.

In illustrated virtualization system 202, VMM 221 exposes resources of hardware machine 130 as virtual machine VM 211. For simplicity of illustration, only a single virtual machine is illustrated. In general, VMM 221 manages utilization of underlying hardware structures and states, typically through a combination of direct execution, selective binary translation, mapping and/or emulation techniques. When possible, it can be desirable to directly execute code that is scheduled for execution on a virtual machine (e.g., vCPU 261) on an underlying hardware processor (e.g., CPUs 131). However, for at least some instruction set architectures, binary translation or emulation of at least certain code and/or instructions may be necessary. Similarly, it can be desirable for memory accesses performed by code executing on the virtual machine to efficiently map to locations in underlying hardware memory (e.g., MEM 132) using memory management constructs such a page tables and translation lookaside buffers (TLBs) exposed to guest software as part of a virtual machine but maintained coherently with memory management facilities of underlying hardware.

Typically, both the internals of any direct execution and/or binary translation mechanism and the internals of any segmentation/memory management virtualization mechanisms will be hidden from guest computations. Accordingly, a virtualization barrier 292 is illustrated in FIG. 2 to mark a somewhat arbitrary boundary between exposed (and therefore visible) states, functionality and constructs of VM 211 and those states, functionality and constructs of VMM 221 (and underlying hardware 130) that are hidden from guest computations.

Of course, a number of significant practical challenges exist for virtualization system implementations that seek to directly execute code and coherently map underlying physical memory, particularly for virtualization of processors that implement the ubiquitous x86 or IA-32 instruction set architecture. In particular, practical implementations must typically deal with instruction sets that include instructions (sometimes called non-virtualizable instructions) that behave differently depending on an execution mode. Classic examples include instructions such as the IRET and PUSHF instructions implemented in x86 processors which behave differently based on a privilege level. Another set of practical challenges involves implementations of segmented architectures that include segment registers which are used to help manage and provide protection for a memory address space. In particular, semantics of certain IA-32-specific segment operations lead to reversibility challenges that are described and addressed in the art. While elegant solutions to these problems can be non-trivial, and virtualization system embodiments in accordance with the present invention may build upon such solutions, embodiments of the present invention relate more directly to selective alteration of virtual machine behavior for targeted execution contexts.

Therefore, certain aspects of virtualization system implementations are summarized and certain more detailed descriptions of specific implementations are incorporated herein by reference from: (a) U.S. Pat. No. 6,397,242 to Devine, Bugnion and Rosenblum describes methods for managing a mix of directly executable code and code for which binary translation may be performed; (b) U.S. Pat. No. 6,704,925 to Bugnion which, among other things, describes implementation of a dynamic binary translator mechanism and methods for maintaining coherence of a translation cache; (c) U.S. Pat. No. 6,785,886 to Lim, Le and Bugnion which, among other things, describes methods for shadowing segment descriptors in a VMM implementation and maintaining backmaps to address segment reversibility challenges; and (d) U.S. Pat. No. 7,222,221 to Agesen, Subrahmanyam and Adams which, among other things, describes methods for maintaining shadow page tables in a virtualization system and for maintaining coherence between related memory management data structures a VM, a VMM and underlying hardware. U.S. Pat. Nos. 6,397,242, 6,704,925, 6,785,886 and 7,222,221 are therefore each incorporated herein by reference and persons of ordinary skill in the art will appreciate, based on the description herein, virtualization system implementations that build upon code execution/translation methods and/or segment/memory management virtualization methods described in detail in any of the incorporated patents.

Notwithstanding the foregoing, persons of ordinary skill in the art will readily understand embodiments of the present invention with reference to a more simplified view of VMM operations presented in FIG. 2. For example, in the illustration of FIG. 2, VMM 221 provides selective code execution facilities 293 (using any suitable mechanism including but not limited to those described in the above-incorporated patents). In general, selective code execution facilities 293 allow certain code to execute directly on underlying hardware in furtherance of the computation executing on exposed vCPU 261 while supporting at least some method (e.g., a binary translation method, hardware assisted virtualization or other trap and emulate methods, etc.) for executing alternative or modified instruction sequences when needed or when desirable. In general, hardware-assisted virtualization methods include those extensions to 32-bit and 64-bit x86 architecture commonly known as IVT (Intel® Virtualization Technology) and AMD-V™ (AMD Virtualization), which provide hardware support for trap and emulate methods whereby a VMM may specify those events that will cause the hardware to exit guest execution and trap into the VMM.

Apart from embodiments of the present invention, the availability of a binary translation for certain instructions or code blocks facilitates use of an efficient direct execution path for most code, while ensuring that non-virtualizable instructions or code blocks can be handled in a way that is faithful to the function/semantics of the original code. However, relative to embodiments of the present invention, selective code execution facilities 293 (whether supported using binary translation, hardware-assisted trap and emulate methods, or otherwise) can be adapted to provide a method for selectively altering the behavior of VM 211 for a targeted execution context. In particular, some embodiments employ facilities of a binary translation, emulation, or other facility to replace original code sequences (or individual instructions) that would ordinarily be executed in connection with current context 241 with code that need not (and indeed purposefully may not) faithfully replicate the function/semantics of the original code.

Accordingly, as illustrated in FIG. 2, VMM 221 is configured to monitor some VM 211 construct (illustrated as indication 296) for correspondence with an execution context that has been identified as malicious. For example, in embodiments in which VM 211 virtualizes an IA-32 processor architecture, VMM 221 can be configured to monitor the exposed CR3 register construct for a process id (PID) match with that of a context identified as malicious. On such a match, VMM 221 may choose not to directly execute certain instructions or code (or for that matter even faithfully replicate the function/semantics of the original code) when the identified execution context is active. Instead, VMM 221 may direct (297) selective code execution facility 293 to execute alternative code that:

generates (in the malicious context) a fault or trap not dictated by the faithful emulation of the machine virtualized;

prevents, skips or modifies a system call that would otherwise be executed in the course of the malicious context;

overwrites, patches, or otherwise modifies the binary code associated with the malicious context; or artificially delays some operation (e.g., an I/O operation) performed for the malicious context.

In a similar way, mapping, shadowing and tracing mechanisms 295 employed by VMM 221 to efficiently handle segmentation and memory management expose a VM-specific set of segment register states, TLB states and page table hierarchies, while mapping memory accesses and paging operations to underlying states and locations in memory 132. As with the selective code execution facilities 293 described above, mapping, shadowing and tracing mechanisms 295 are typically used to faithfully present virtual and physical address spaces consistent with the machine virtualized. However, in accordance with one or more embodiments of the present invention, the similar facilities may be used to alter the virtualization of exposed memory and selectively impede a particular execution context.

For example, as illustrated in FIG. 2, VMM 221 is configured to monitor some VM 211 construct (e.g., indication 296) such as exposed CR3 (or page table Base Register, PTBR) for correspondence with an execution context that has been identified as malicious. Based on a PID match or other correspondence, VMM 221 directs (297) mapping, shadowing and tracing mechanisms 295 to alter memory mappings or tracing behavior for execution context 241. In this way, VMM 221 may:

modify memory address mappings to deny the malicious context the ability to read, write, or execute particular pages of memory; or trigger and handle faults if and when the malicious context attempts to read, write, or execute particular pages of memory.

Note that in general, when such faults are triggered, they may be handled within the VMM itself. Alternatively, the VMM may forward (or expose) the fault to the guest operating system for handling or may choose to take some other appropriate action.

In each case, monitoring and selective alteration of VM behavior are performed from behind virtualization barrier 292 and may be hidden from both guest operating system 151 and the affected execution context (e.g., current context 241). Building on the foregoing illustration of a suitable virtualization system infrastructure, a few strategies for selectively impeding progress of a targeted execution context are described.

Mechanisms for Impeding Progress

As previously described, virtualization software can observe switches between guest contexts (e.g., based on some state of VM 211). Accordingly, VMM 221 can determine when a particular execution context has been scheduled by the guest OS, and take action to impede its progress, if desired. As previously described, embodiments of the present invention do not presuppose any particular anti-malware system or technique for identifying that a particular execution context is malicious. Indeed, based on the description herein, persons of ordinary skill in the art will recognize the general applicability of our techniques to a broad range of anti-malware techniques, systems and strategies including those hereafter developed. Therefore, in the illustrations that follow, embodiments are described for selectively impeding progress of an identified context apart from any particular mechanism for identifying a context as malicious.

In general, embodiments of the present invention described herein may be used individually, or in combination, e.g., to increase their effectiveness. Some embodiments may be applicable only in certain situations, such as when the malicious context is executing in guest user-mode or guest kernel-mode, while others may be more generally applicable.

Spurious Fault Injection

Figure 3:
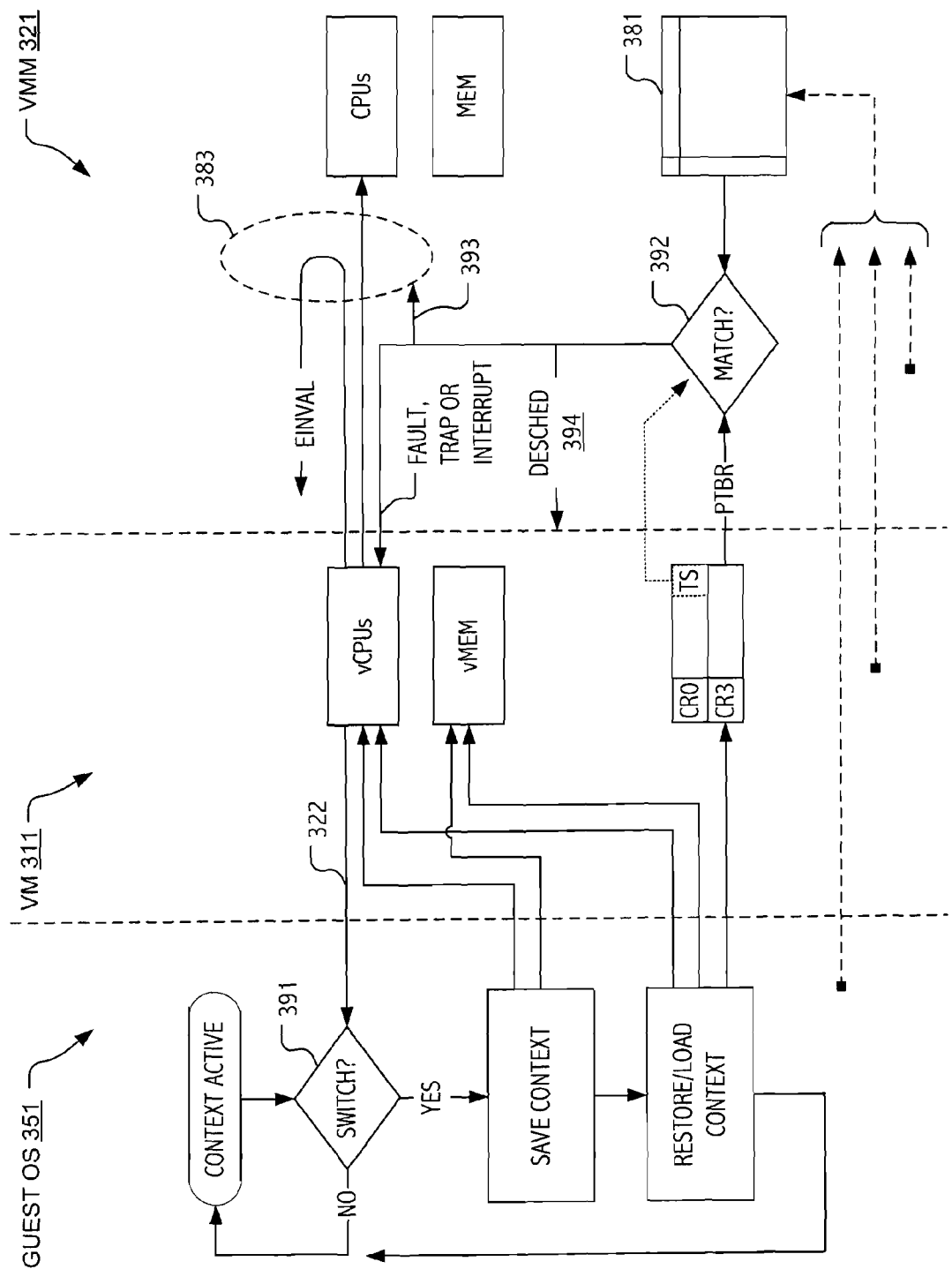
FIG. 3 is used to illustrate exemplary scenarios in which selective alterations to the execution characteristics of a virtualization system are employed to impede progress of a particular execution context.

In some embodiments in accordance with the present invention, a virtualization system is configured to selectively introduce faults, traps, interrupts or other events into a context that is identified as malicious. For example, an "illegal instruction" fault can be generated by the virtualization system, regardless of the actual validity of the instruction being executed by/for the malicious context. FIG. 3 illustrates an exemplary scenario in which a guest computation (e.g., guest operating system 351 and various contexts thereof) execute on VM 311 which is exposed from underlying hardware resources by VMM 321. Based on a context switch 391, which may be triggered in any of the usual ways (e.g., based on operating system scheduling, control flow in the current context, page fault, interrupt, etc.) relevant states of a current context (e.g., registers, call stack, etc.) are saved and those of another context are restored. In the course of the context switch, states of virtual control registers implemented by VM 311 will be updated.

For example, in a virtualization of an IA-32-type processor architecture, an architecturally-defined control register such as the CR0 register will contain a task switch flag and a CR3 register will identify the location of a page table base register (PTBR) that is associated with the new context. Therefore, by monitoring the state of these exposed, architecturally-defined features, VMM 321 may observe the context switches and compare an identifier or attribute of the new/current context against an encoding 381 of identifiers or attributes for contexts that are identified as malicious. On a match (392), VMM 321 may supply a fault, trap, interrupt or other event irrespective of whether the machine as exposed VM 311 would ordinarily do so in the course of a faithful emulation of the particular hardware machine virtualized. For example, as suggested above, VMM 321 may generate and supply an "illegal instruction" fault even though the corresponding instruction is, in fact, perfectly legal. If the malicious context is running in guest user-mode, the supplied fault will typically cause guest operating system 351 to terminate the context in which the "illegal" instruction was executed. Similarly, other types of fault or exceptions may be generated, depending on the particular processor architecture, to achieve similar results.

As before, embodiments of the present invention do not presuppose any particular anti-malware system or technique for identifying that a particular execution context is malicious. Accordingly, the exemplary embodiment of FIG. 3 illustrates a variety of possible sources for identifiers (e.g., PIDs) or attributes that are used to match a current context. For example, traditional anti-virus software executing in conjunction with guest operating system 351 as well as virtualization system supported (e.g., VMM-resident) anti-malware techniques and even hardware-based mechanisms may be employed to generate appropriate identifiers or attributes for comparison against a corresponding identifier or attribute of the current context.

Interference/Interdiction of System Calls

VMM 321 may also selectively alter the way it handles system calls on behalf of an execution context which, based on a match (e.g., 392), is considered to be malicious. As described above, and as now illustrated relative to FIG. 3, selective code execution facilities of a VMM provide a mechanism for selectively altering the instruction sequences actually executed on underlying hardware in ways not dictated by faithful emulation of a physical machine.

Using such facilities, VMM 321 may prevent a malicious context from successfully performing system calls. For example, based on a match (392), VMM 321 may trigger (393) an interdiction/interference mode for binary translation in which the virtualization software intercepts at least some system calls. Ordinarily, system calls transition an execution sequence of instructions of the current context from user-mode to kernel-mode. Unfettered access, by malicious code, to kernel operations may be particularly problematic.

Accordingly, rather than allow a malicious context to invoke the specified guest kernel operation, VMM 321 may simply cause the system call to fail immediately. A typical system call interface defines some register or memory location to hold a return status value. Therefore, rather than performing the operations normally associated with faithful emulation of the virtualized hardware processor, selective code execution facilities of VMM 321 may alter (383) the instruction sequences actually supplied for execution on an underlying CPU to instead execute an instruction sequence that sets the return status to a documented error code value, e.g., EINVAL in Linux. Alternatively, the VMM 321 can cause a different system call to be invoked, e.g., by altering the system call number specified by the malicious context. For example, with a Linux guest OS, the system call number can be changed to invoke the _exit( ) system call, causing the malicious context to terminate, as if it had exited voluntarily.

Code Modifications, Generally

Similarly, VMM 321 may modify code or control flow of an execution context which, based on match 392, is considered to be malicious. In general, VMM 321 may overwrite, patch, or otherwise modify (383) binary code that would normally be executed for the current context. For example, particular instructions can be overwritten with "nop" opcodes, thereby neutering actual code that would ordinarily be executed by the malicious context. Similarly, the control flows of the malicious context can be changed by modifying the destination addresses of branches, jumps, or return instructions. Alternatively, VMM 321 can directly "warp" the program counter associated with a guest context, causing it to resume in some benign or controlled code region, or terminate.

Page Table Manipulations

Figure 4:
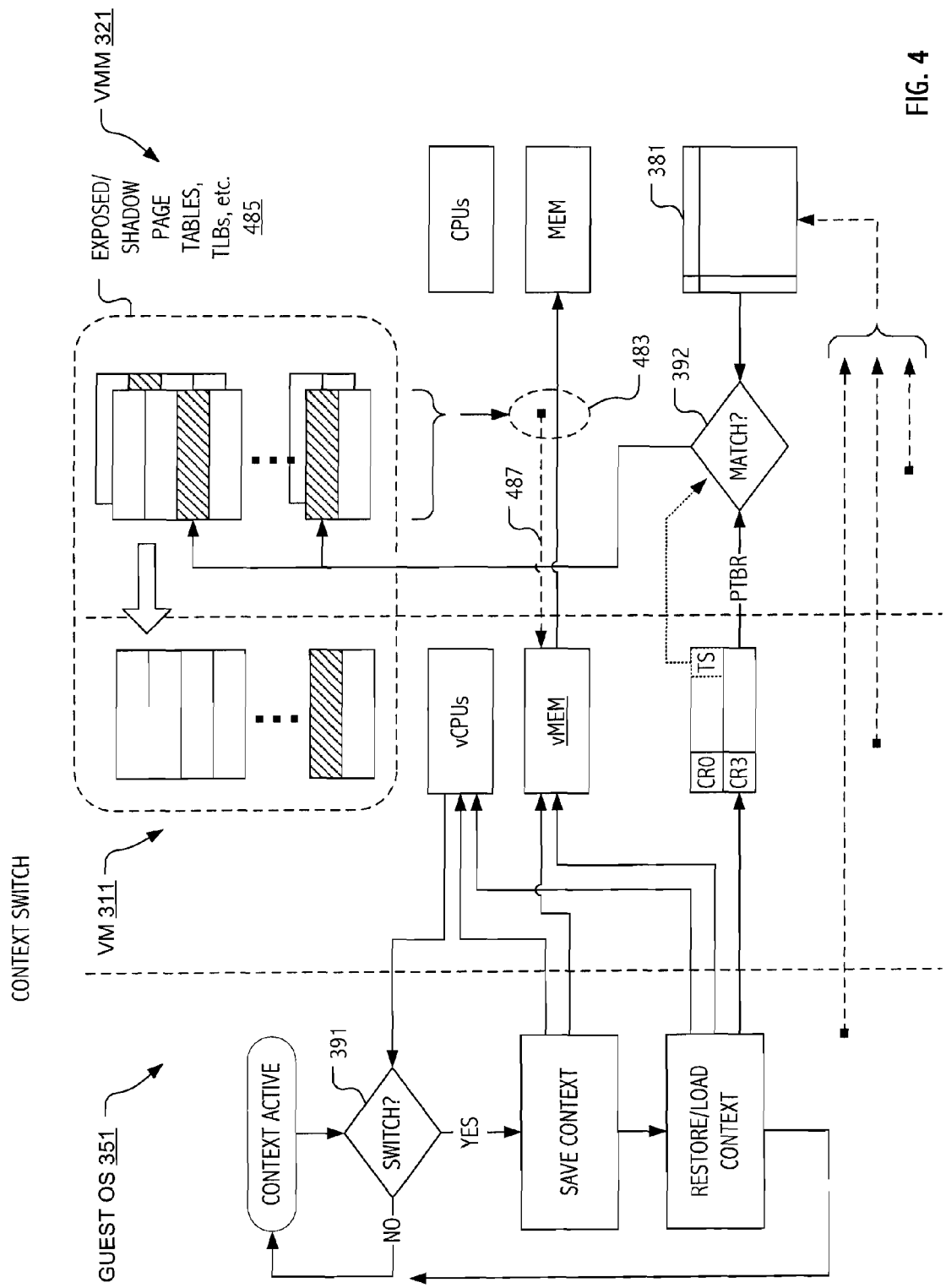
FIG. 4 is used to illustrate exemplary scenarios in which selective alterations to the memory mapping and/or management facilities of a virtualization system are employed to impede progress of a particular execution context.

In addition (or as an alternative) to embodiments that are based on selectively altering the code that would ordinarily be executed by the virtualization system, some embodiments now illustrated with reference to FIG. 4 selectively alter memory mappings maintained by VMM 321. For example, based on a current context match (392) with some identifier or attribute for a malicious context, VMM 321 may manipulate the page tables associated with that context in a way that alters or limits execution behaviors ordinarily associated with faithful emulation of the machine virtualized.

In particular, VMM 321 can modify memory address mappings maintained in page tables, TLB entries, etc. (illustrated collectively as exposed/shadow page tables and TLBs 485) to deny the malicious context the ability to read, write, or execute particular pages of memory. For example, guest virtual pages that are mapped using page table and/or TLB entries maintained for the current context can be unmapped, remapped, or protected by modifying the page table entries maintained by guest operating system 351 and exposed (as part of VM 311) by VMM 321. Alternatively, these mappings can be similarly manipulated by modifying the "shadow" page tables maintained by the virtualization layer, which are not exposed (or visible) to guest operating system 351 and the execution contexts thereof. In either case, memory address mappings (e.g., mappings 483) are affected.

Behavior of the exposed memory vMEM can be selectively altered in a variety of ways that may prove useful in impeding progress of the malicious context. For example, if desirable, sensitive memory targets that would normally be accessed in the course of execution of the malicious context can be shielded, spoofed or redirected. As a result, malicious updates/accesses to sensitive in-memory state may avoided or subverted. In some cases, alterations may be entirely transparent and not visible to the malicious context. In some cases, alterations to memory mapping information may be designed to trigger spurious faults 487 which are returned to the malicious context.

Timer Interrupt Burst

Referring to FIG. 3, another progress impeding technique that may be employed by VMM 321 involves delivery of a burst of timer interrupts to the processor of VM 311 on which the malicious context is scheduled. Most guest operating systems use timer interrupts to perform statistical process accounting, charging the context that is currently scheduled for consuming a whole timer tick's worth of processor time. Therefore, by purposefully supplying the appropriate processor with a series of timer interrupts in quick succession, VM 311 can trick guest operating system 351 into believing that the malicious context has consumed a large amount of processor time, when in reality it has consumed very little. As before, the malicious execution context is selectively targeted based on a match (392).

Typically, based on the burst of timer interrupts, guest operating system 351 will quickly deschedule the malicious context, which will appear to have exhausted its scheduling quantum. Guest operating system 351 will then preferentially schedule other, non-malicious contexts. By selectively supplying bursts of timer interrupts to contexts that have been identified as malicious, VMM 321 distorts the operating system's own scheduling mechanism in a way that selectively deprives the malicious contexts of processor cycles.

Alternatively, VMM 321 may simply deschedule (394) execution of VM 311 (or some of its virtual CPUs) when a malicious context is scheduled by guest operating system 351 for execution on VM 311. In some cases, VM 311 may impede progress of the malicious context by infrequently scheduling VM 311 computations for execution and/or by allowing such computations to run only for a small fraction of real time (e.g., by giving VM 311 a very low scheduling priority, by placing a vCPU (or underlying hardware) in a reduced-level power management mode, by reducing operating frequency/voltage, or by adjusting other scheduling parameters to reduce CPU consumption). As before, the operation of the virtualization system is selectively altered based on a match (392) and targets the malicious guest by effectively depriving it of processor cycles.

Resource Distortion

In addition to processor cycles, other resources normally delivered to an execution context may be selectively distorted by VMM 321 based on an identifier/attribute match (392). For example, VMM 321 may choose to artificially delay I/O operations issued from a malicious context. In general, selective execution facilities of VMM 321 can be employed for this selective alteration of behavior as well.

The virtualization software interposes on I/O operations and can introduce additional delays to slow down the malicious context. For example, the completion interrupt associated with a guest network write and normally supplied to a vCPU of the exposed VM can be deliberately delayed, making it appear to the malicious context as if the (virtual) network were extremely slow.

Virtualization System Technology and Variations

Based on the foregoing, persons of ordinary skill in the art will appreciate a variety of strategies by which a virtualization system can monitor and selectively alter virtual machine behavior for a particular execution context. Typically, the selective alterations are performed from behind a virtualization barrier and may be hidden from both the guest operating system and the affected execution context. In general, the described embodiments may be exploited in a variety of virtualization system designs including those now reviewed.

As is well known in art, a virtual machine (VM) is a software abstraction—a "virtualization"—of an actual physical computer system. FIGS. 1-4 illustrate aspects of embodiments of the present invention for selectively impeding progress of malicious contexts. In describing embodiments of the present invention, certain aspects of more complete virtualization system implementations have been abstracted. To facilitate an understanding of the broad applicability of embodiments of the present invention, a few examples of specific virtualization system designs and variations thereon are described.

In general, in most virtualization system designs, some interface is provided between guest software within a VM and the various hardware components and devices in the underlying hardware platform. This interface—which can generally be termed "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms (when used in the art) do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself; however, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself. Unless otherwise indicated, embodiments of the present invention may be used (and/or implemented) in (or in conjunction with) virtualized computer systems having any type or configuration of virtualization software.

In view of the above, and without limitation, an interface usually exists between a VM and the underlying platform which is responsible for actually executing VM-issued instructions and transferring data to and from the memory and storage devices or underlying hardware. Subject to the foregoing, certain commercially available virtualization systems employ a "virtual machine monitor" (VMM) in this role. A VMM is usually implemented as a thin piece of software that runs directly on top of a host, or directly on the hardware, and virtualizes at least some of the resources of the physical host machine. The interface exported to the VM is then the same as the hardware interface of a physical machine. In some cases, the interface largely corresponds to the architecture, resources and device complements of the underlying physical hardware; however, in other cases it need not.

Although the VM (and thus applications executing in the VM and their users) cannot usually detect the presence of the VMM, the VMM and the VM may be viewed as together forming a single virtual computer. They are shown and described herein as separate components for the sake of clarity and to emphasize the virtual machine abstraction achieved. However, the boundary between VM and VMM is somewhat arbitrary. For example, while various virtualized hardware components such as virtual CPU(s), virtual memory, virtual disks, and virtual device(s) including virtual I/O devices can be presented as part of previously described VMs (see FIGS. 1-4), in some virtualization system implementations, these "components" are at least partially implemented as constructs or emulations exposed to a VM by the VMM. One advantage of such an arrangement is that the VMM may be set up to expose "generic" devices, which facilitate VM migration and hardware platform-independence. In general, such functionality may be said to exist in the VM or the VMM.

Figure 5:
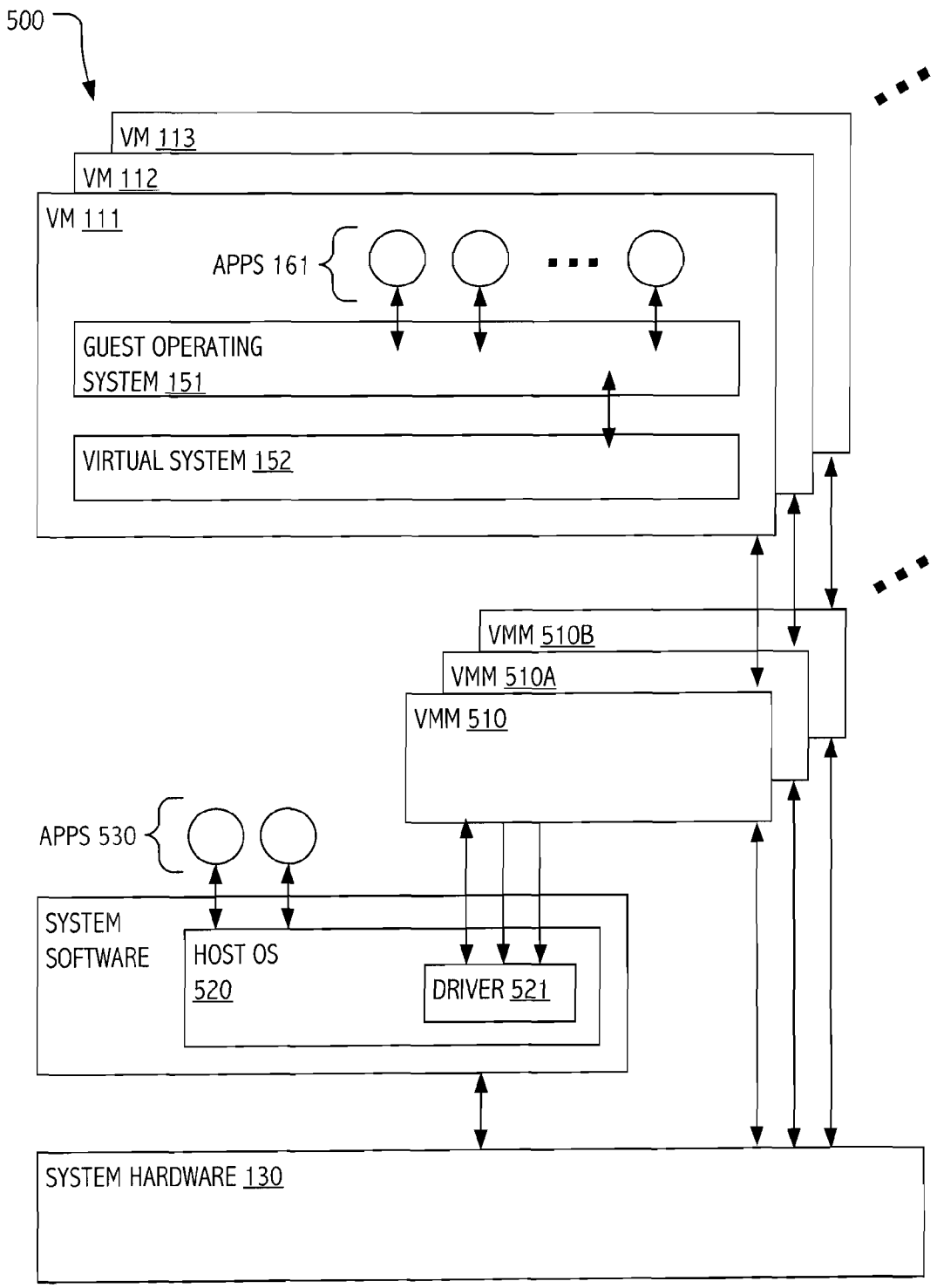
FIGS. 5 and 6 depict functional block diagrams of virtualization system configurations in accordance with respective embodiments of the present invention.
Figure 6:
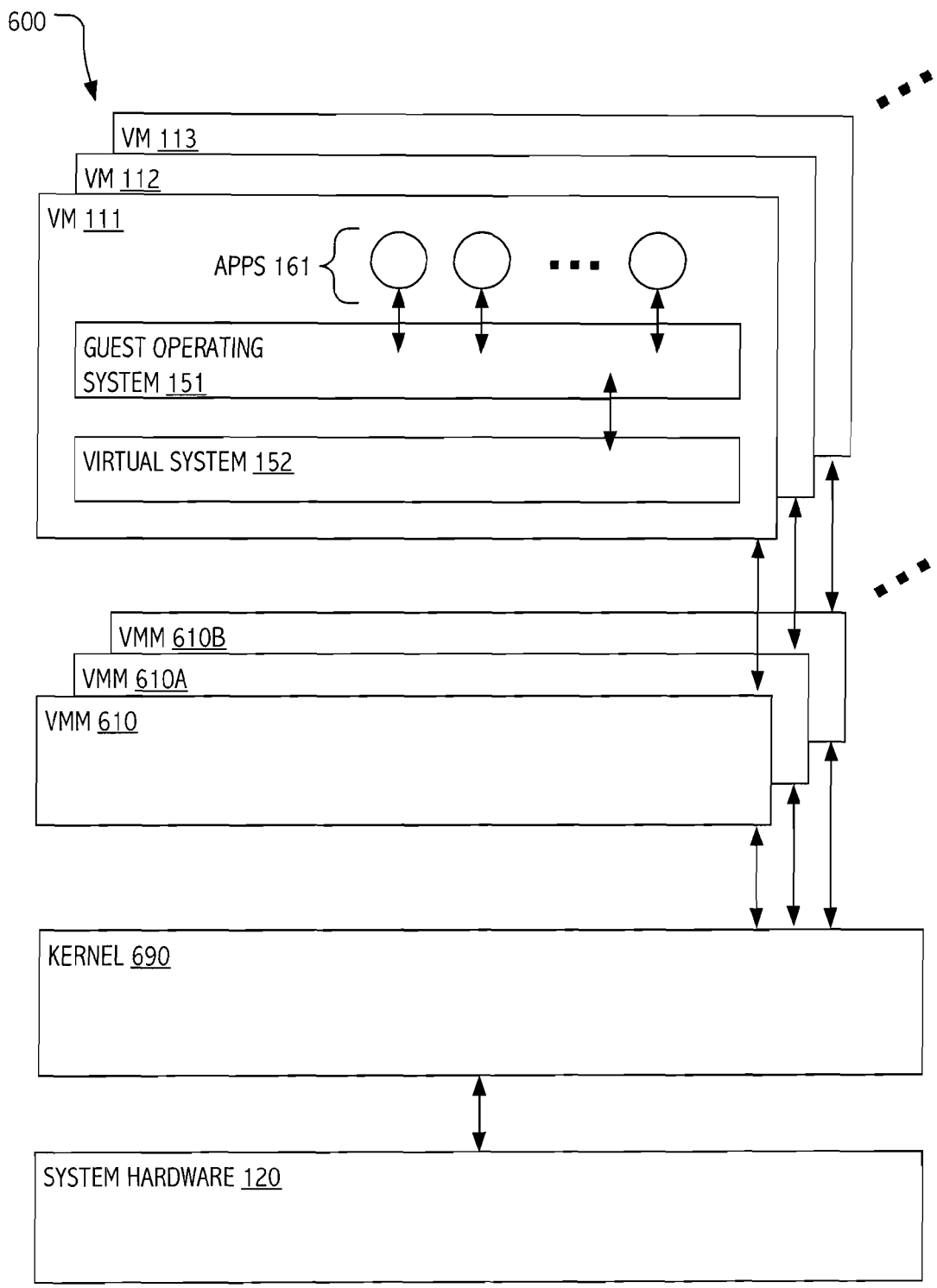

It should be noted that while VMMs can be viewed as executing on underlying system hardware, many implementations based on the basic abstraction may be implemented. In particular, some implementations of VMMs (and associated virtual machines) execute in coordination with a kernel that itself executes on underlying system hardware, while other implementations are hosted by an operating system executing on the underlying system hardware and VMMs (and associated virtual machines) execute in coordination with the host operating system. Such configurations, sometimes described as "hosted" and "non-hosted" configurations, are illustrated in FIGS. 5 and 6. In the hosted configuration, an existing, general-purpose operating system (OS) acts as a "host" operating system that is used to perform certain I/O operations. In the "non-hosted" configuration, a kernel customized to support virtual computers takes the place of the conventional operating system.

Embodiments of the present invention for selectively impeding progress of malicious guest computations may build on systems of either configuration. Accordingly, in view of the variations, two exemplary virtualization system configurations are summarized and, based on the preceding description, persons of ordinary skill in the art will appreciate suitable hosted and non-hosted embodiments of the present invention.

Hosted Virtual Computers

FIG. 5 illustrates a virtualization system configuration 500 commonly referred to as a "hosted" virtualized computer system in which a virtual machine monitor (e.g., VMM 510, VMM 510A, VMM 510B) is co-resident at system level with the host operating system 520 such that both the VMMs and the host operating system can independently modify the state of the host processor. VMMs call into the host operating system via driver 521 and a dedicated one of the user-level applications 530 to have the host OS perform certain I/O operations on behalf of the VM. The virtual computer in this configuration is thus hosted in that it runs in coordination with an existing host operating system. Virtualization systems that include suitable facilities are available in the marketplace. For example, VMware® Server virtual infrastructure software available from VMware, Inc., Palo Alto, Calif. implements a hosted virtualization system configuration consistent with the illustration of FIG. 5. VMware® Workstation desktop virtualization software, also available from VMware, Inc. also implements a hosted virtualization system configuration consistent with the illustration of FIG. 5.

Non-Hosted Virtual Computers

FIG. 6 illustrates a virtualization system configuration commonly referred to as a "non-hosted" virtualized computer system in which a dedicated kernel 690 takes the place of and performs the conventional functions of a host operating system. Virtual computers (e.g., VM/VMM pairs) run on the kernel. Compared with a system in which VMMs run directly on the hardware platform, use of a kernel offers improved performance because it can be co-developed with the VMMs and optimized for the characteristics of a workload consisting of VMMs rather than a more general collection of tasks. Moreover, a kernel can also be optimized for I/O operations and it can facilitate provision of services that extend across multiple VMs (for example, for resource management). Virtualization systems that include suitable kernels are available in the marketplace. For example, ESX Server™ virtual infrastructure software available from VMware, Inc., Palo Alto, Calif. implements a non-hosted virtualization system configuration consistent with the illustration of FIG. 6. ESX Server is a trademark of VMware, Inc.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another term which has yet to achieve a universally accepted definition is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define the term para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, virtualized computer system-based realizations of the present invention are not restricted to use in systems with any particular "degree" of virtualization and is not to be limited to any particular notion of full or partial ("para-") virtualization. Furthermore, embodiments of techniques described herein for impeding or interdicting system calls can also be applied to "hypercalls" between a guest and a VMM or hypervisor. In general, hypercall mechanisms are part of a well-defined interface for transitioning between the guest and the VMM/hypervisor, while system call mechanisms are part of a well-defined interface for transitioning between user-mode and kernel-mode. Accordingly, based on the description herein, persons of ordinary skill in the art will appreciate analogous, hypercall-targeted adaptations of the aforementioned techniques for impeding or interdicting system calls.

Other Embodiments

While the invention(s) is (are) described with reference to various implementations and embodiments, it will be understood that these embodiments are illustrative and that the scope of the invention(s) is not limited to them. In general, virtual machines may be implemented consistent with hardware system now existing or hereafter defined. In addition, while our description of virtualization techniques has generally assumed that the virtual machines present interfaces consistent with a hardware system, persons of ordinary skill in the art will recognize that the techniques described may be used in conjunction with virtualizations that do not correspond directly to any particular hardware system. Virtualization systems in accordance with the present invention, implemented as hosted embodiments, non-hosted embodiments or as embodiments that tend to blur distinctions between the two, are all envisioned.

Although achieving a goal of VMM transparency may be facilitated using techniques of the present invention, VMM transparency is not required. Rather, the virtualization system techniques for impeding progress of malicious guest software may be incorporated in so-called "para-virtualization" systems in which a guest operating system is aware that it is being virtualized, and has an explicit interface to the VMM. In such systems, functionality analogous to that described herein as a VMM is sometimes referred to as a "hypervisor."

Many variations, modifications, additions, and improvements are possible. For example, while strategies for impeding progress of a malicious context have been described in detail herein, other techniques and strategies will also be appreciated by persons of ordinary skill in the art based on the description herein. Furthermore, while techniques and mechanisms have been described using particular network configurations, hardware architectures, memory organizations and particular operating system constructs (typically IA-32 based architectures/systems and Windows or Linux-based operating systems) as a descriptive framework, persons of ordinary skill in the art will recognize that it is straightforward to modify such implementations for use in systems that support other processor instruction set architectures, other network or memory configurations and/or other operating system constructs.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method of operating a virtualization system comprising virtualization software instantiated on an underlying hardware machine, the virtualization software running a virtual machine in which a plurality of execution contexts execute, a guest operating system also running in the virtual machine and coordinating the execution of the execution contexts, the method comprising:

executing at the virtual machine, under control of the virtualization software, instruction sequences that correspond to the plurality of execution contexts;

monitoring a particular one of the plurality of execution contexts of the virtual machine when the particular one of the plurality of execution contexts is identified as malicious, the virtualization software performing the monitoring;

identifying the particular one of the plurality of execution contexts for impeding based on the monitoring; and impeding computational progress of the particular one of the plurality of execution contexts with respect to other execution contexts executing within the virtual machine while allowing the other execution contexts of the virtual machine to continue executing, the impeding being caused by the virtualization software, wherein the impeding includes, for a particular instruction sequence corresponding to the particular one of the plurality of execution contexts, selectively altering behavior of the virtual machine so that, with respect to the particular instruction sequence, the behavior diverges from faithful emulation of a physical machine.

2. The method of claim 1, wherein the particular one of the plurality of execution contexts is a malicious context.

3. The method of claim 1, wherein the execution contexts include processes, threads or tasks that are coordinated by the guest operating system.

4. The method of claim 3, wherein the monitoring and the impeding is performed from behind a virtualization bather.

5. The method of claim 1, wherein the monitoring and the impeding are hidden from the execution contexts.

6. The method of claim 1, wherein the altered behavior includes supplying, in response to an otherwise valid instruction, a fault, trap or interrupt not dictated by the faithful emulation.

7. The method of claim 1, wherein the altered behavior includes interdicting a transition of the virtual machine from user mode to kernel mode, wherein the interdicted transition is attempted in connection with execution, for the particular one of the plurality of execution contexts, of an otherwise valid system call.

8. The method of claim 7, wherein the interdicting includes one or more of:
returning an error without executing the otherwise valid system call; and
performing an alternative system call in lieu of the otherwise valid system call.

9. The method of claim 1, wherein the altered behavior includes interdicting a hypercall attempted in connection with execution of the particular one of the plurality of execution contexts.

10. The method of claim 1, wherein the altered behavior includes supplying the virtual machine with a succession of events not dictated by the faithful emulation, but rather selected to cause the guest operating system to deschedule or deprioritize computations of the particular one of the plurality of execution contexts.

11. The method of claim 10, wherein the events include timer interrupts delivered at a rate that exceeds that expected by the guest operating system.

12. The method of claim 1, further comprising:
modifying page table entries associated with the particular one of the plurality of execution contexts to preclude the particular one of the plurality of execution contexts from reading from, writing to or executing from an otherwise mapped memory page.

13. The method of claim 12, wherein the modified page table entries are maintained by the virtualization software and are not visible to the execution contexts of the virtual machine.

14. The method of claim 1, wherein the monitoring includes:

checking, coincident with switches between execution contexts of the virtual machine, at least one characteristic of a switched-to execution context against one or more characteristics of an execution context identified as malicious.

15. The method of claim 14, wherein the checked-against characteristic is selected from a set that includes:
a process, thread or task identifier; and
presence, in a mapped address space of the switched-to execution context, of one or more memory pages associated with malicious code.

16. The method of claim 1, wherein the identifying of the particular one of the plurality of execution contexts includes identifying a malicious execution context.

17. The method of claim 16, wherein the identifying is performed using one or more of:
an antivirus system;
an intrusion detection system; and
content- or behavior-based identification by the virtualization software.

18. The method of claim 1, wherein the virtualization software includes a hypervisor that is executed under control of a host operating system.

19. The method of claim 1, wherein the virtualization software includes a hypervisor that is executed directly on the underlying hardware machine.

20. A method of operating a virtualization system comprising virtualization software instantiated on an underlying hardware machine, the virtualization software running a virtual machine in which a plurality of execution contexts execute, a guest operating system also running in the virtual machine and coordinating the execution of the execution contexts, the method comprising:
executing at the virtual machine, under control of the virtualization software, instruction sequences that correspond to the plurality of execution contexts;
monitoring a particular one of the plurality of execution contexts of the virtual machine when the particular one of the plurality of execution contexts is identified as malicious, the virtualization software performing the monitoring;
identifying the particular one of the plurality of execution contexts for impeding based on the monitoring; and
impeding computational progress of the particular one of the plurality of execution contexts with respect to other execution contexts executing within the virtual machine while allowing the other execution contexts of the virtual machine to continue executing, the impeding being caused by the virtualization software, wherein the impeding includes altering a particular instruction sequence associated with the particular one of the plurality of execution contexts identified as malicious that would be otherwise executed for the particular one of the plurality of execution contexts.

21. The method of claim 20, wherein:
the altered instruction sequence includes binary code executed by the virtualization system for the particular one of the plurality of execution contexts; and
the altering includes overwriting, patching or otherwise modifying the binary code to alter semantics or control flow of the particular one of the plurality of execution contexts.

22. The method of claim 20, wherein the altering is performed by the virtualization software and is not visible to execution contexts of the virtual machine.

23. A method of operating a virtualization system comprising virtualization software instantiated on an underlying hardware machine, the virtualization software running a virtual machine in which a plurality of execution contexts execute, a guest operating system also running in the virtual machine and coordinating the execution of the execution contexts, the method comprising:

executing at the virtual machine, under control of the virtualization software, instruction sequences that correspond to the plurality of execution contexts;

monitoring a particular one of the plurality of execution contexts of the virtual machine when the particular one of the plurality of execution contexts is identified as malicious, the virtualization software performing the monitoring;

identifying the particular one of the plurality of execution contexts for impeding based on the monitoring; and impeding computational progress of the particular one of the plurality of execution contexts with respect to other execution contexts executing within the virtual machine while allowing the other execution contexts of the virtual machine to continue executing, the impeding being caused by the virtualization software, wherein the impeding includes restricting use of a resource mapped by the virtual machine by the particular one of the plurality of execution contexts identified as malicious to impede access of the resource.

24. The method of claim 23, wherein the restricted resource includes memory, input/output bandwidth, device functionality or processor cycles exposed to the particular one of the plurality of execution contexts of the virtual machine.

25. The method of claim 23, wherein the restricting includes descheduling or deprioritizing one or more virtual processors of the exposed virtual machine coincident with scheduling, by the guest operating system, of the particular one of the plurality of execution contexts for execution thereon.

26. The method of claim 23, wherein the restricting includes changing operating frequency or power management state of the exposed virtual machine or underlying hardware coincident with scheduling, by the guest operating system, of the particular one of the plurality of execution contexts for execution thereon.

27. The method of claim 23, wherein the restricting includes delaying completion or apparent completion of an input/output operation initiated by the particular one of the plurality of execution contexts.

28. A non-transitory machine readable medium having encoded thereon executable code for execution by one or more processors, the executable code including virtualization software that, from behind a virtualization barrier, is configurable to:

monitor a malicious context in a virtual machine when the malicious context is identified as malicious, the virtualization software performing the monitoring;

identify the malicious context for impeding based on the monitoring; and selectively impede progress of the malicious context with respect to other execution contexts executing within the virtual machine while allowing the other execution contexts to continue executing within the virtual machine, the impeding caused by the virtualization software from behind the virtualization barrier, wherein:

the virtualization software coordinates execution of respective instruction sequences that correspond to the execution contexts, including the malicious context, operative on the virtual machine; and the impeding includes selectively altering, for a particular instruction sequence that corresponds to the malicious context, behavior of the virtual machine so that, with respect to the particular instruction sequence, the behavior diverges from faithful emulation of a physical machine.

29. The machine readable medium of claim 28, wherein the virtual machine includes a guest operating system that coordinates the execution of the malicious context and the other execution contexts.

30. The machine readable medium of claim 28, wherein the altered behavior includes one or more of:

supplying, in response to an otherwise valid instruction of the sequence, a fault, trap or interrupt not dictated by faithful emulation of the machine virtualized;

interdicting a transition of the virtual machine from user mode to kernel mode, wherein the interdicted transition is attempted in connection with execution, for the malicious context, of an otherwise valid system call;

supplying a guest operating system that coordinates execution of the execution contexts with a succession of events not dictated by faithful emulation of the machine virtualized, but rather selected to cause the guest operating system to deschedule or deprioritize computations of the malicious context; and modifying page table entries associated with the malicious context to preclude the malicious context from reading from, writing to or executing from an otherwise mapped memory page.

31. The machine readable medium of claim 28, wherein the impeding includes altering, the particular instruction sequence of the malicious context, wherein the alteration is not visible to execution contexts operative in the virtual machine.

32. The machine readable medium of claim 28, wherein the impeding includes restricting use by the malicious context of a resource mapped by the exposed virtual machine, the restricted resource including one or more of memory, input/output bandwidth, device functionality and processor cycles exposed to the malicious context.

33. An apparatus comprising:

a hardware machine;

virtualization software encoded in one or more media accessible to the hardware machine and executable to expose a virtual machine using resources of the hardware machine; and guest software encoded in one or more media accessible to the virtual machine, the guest software being executable on the virtual machine, wherein the virtualization software includes code executable on the hardware machine to:

monitor a malicious context in the virtual machine when the malicious context is identified as malicious;

identify the malicious context for impeding based on the monitoring; and selectively impede, from behind a virtualization barrier, progress of the malicious context with respect to other execution contexts executing within the virtual machine while allowing execution of the other execution contexts of the guest software in the virtual machine, wherein:

the virtualization software coordinates execution of respective instruction sequences that correspond to the execution contexts, including the malicious context, operative on the virtual machine; and the impeding includes selectively altering, for a particular instruction sequence that corresponds to the malicious context, behavior of the virtual machine so that, with respect to the particular instruction sequence, the behavior diverges from faithful emulation of a physical machine.

34. The apparatus of claim 33, wherein selectively impede includes one or more of:

code executable to supply, in response to an otherwise valid instruction of the particular instruction sequence, a fault, trap or interrupt not dictated by faithful emulation of the physical machine;

code executable to interdict a transition of the virtual machine from user mode to kernel mode, wherein the interdicted transition is attempted in connection with execution, for the malicious context, of an otherwise valid system call;

code executable to supply a guest operating system that coordinates execution of the execution contexts with a succession of events not dictated by faithful emulation of the physical machine, but rather selected to cause the guest operating system to deschedule or deprioritize computations of the malicious context; and code executable to modify page table entries associated with the malicious context to preclude the malicious context from reading from, writing to or executing from an otherwise mapped memory page.

35. The apparatus of claim 33, further comprising:

code executable to selectively alter emulation by the virtualization software of the particular instruction sequence of the malicious context, wherein the alteration is not visible to execution contexts operative in the virtual machine.

36. The apparatus of claim 33, wherein the virtualization software includes code executable to restrict use by the malicious context of a resource mapped by the exposed virtual machine, the restricted resource including one or more of memory, input/output bandwidth, device functionality and processor cycles exposed to the malicious context.

37. Virtualization software encoded in one or more non-transitory computer readable media accessible to an underlying hardware machine, comprising:

one or more functional sequences executable as, or in conjunction with, the virtualization software to:

monitor a malicious context in a virtual machine when the malicious context is identified as malicious;

identify the malicious context for impeding based on the monitoring; and selectively impede, from behind a virtualization barrier, progress of the malicious context while allowing other execution contexts to continue executing within the virtual machine exposed by the virtualization software, wherein:

the virtualization software coordinates execution of respective instruction sequences that correspond to the execution contexts, including the malicious context, operative on the virtual machine; and the impeding includes selectively altering, for a particular instruction sequence that corresponds to the malicious context, behavior of the virtual machine so that, with respect to the particular instruction sequence, the behavior diverges from faithful emulation of a physical machine.

38. The virtualization software of claim 37, further comprising a binary translator operable with the virtualization software to alter the particular instruction sequence of the malicious context and thereby contribute to the impeding.

39. The virtualization software of claim 37, further comprising a fault, trap or interrupt signaling interface exposed on execution of the virtualization software, the exposed interface configured to supply, in response to an otherwise valid instruction of the malicious context, a fault, trap or interrupt not dictated by faithful emulation of the physical machine and thereby contribute to the impeding.

40. The virtualization software of claim 37, further comprising emulation code for a processor of the exposed virtual machine, the emulation code operable to selectively interdict a transition of the emulated processor from user mode to kernel mode and thereby contribute to the impeding, wherein the interdicted transition is attempted in connection with execution, for the malicious context, of an otherwise valid system call.

41. The virtualization software of claim 37, further comprising an event signaling interface exposed on execution of the virtualization system, the exposed interface configured to supply a guest operating system with events, wherein the exposed interface selectively supplies a succession of events not dictated by faithful emulation of the physical machine, but rather selection to cause the guest operating system to selectively deschedule or deprioritize computations of the malicious context and thereby contribute to the impeding.

42. The virtualization software of claim 37, further comprising memory management code executable to selectively modify page table entries maintained for the malicious context by the virtualization system and thereby contribute to the impeding by precluding the malicious context from reading from, writing to or executing from an otherwise mapped memory page.

* * * * *